(12) United States Patent
Wellham et al.

(10) Patent No.: US 12,031,266 B2
(45) Date of Patent: Jul. 9, 2024

(54) FUNGAL MATERIALS

(71) Applicant: Plant Material Limited, Manchester (GB)

(72) Inventors: Peter A. D. Wellham, Manchester (GB); Mihael Jelecevic, Manchester (GB)

(73) Assignee: Plant Material Limited, Manchester (GB)

( * ) Notice: Subject to any disclaimer, the term of this patent is extended or adjusted under 35 U.S.C. 154(b) by 0 days.

(21) Appl. No.: 18/239,656

(22) Filed: Aug. 29, 2023

(65) Prior Publication Data

US 2023/0407560 A1 Dec. 21, 2023

Related U.S. Application Data

(63) Continuation of application No. PCT/GB2023/051473, filed on Jun. 6, 2023.

(30) Foreign Application Priority Data

Jun. 6, 2022 (GB) ..................................... 2208263

(51) Int. Cl.
*D06N 3/00* (2006.01)
*A23L 33/135* (2016.01)

(52) U.S. Cl.
CPC .......... *D06N 3/0015* (2013.01); *A23L 33/135* (2016.08); *D06N 3/0061* (2013.01); *D06N 2211/06* (2013.01); *D06N 2211/28* (2013.01)

(58) Field of Classification Search
CPC ............... D06N 3/0015; D06N 3/0061; D06N 2211/06; D06N 2211/28; A23L 33/135
USPC ......................................................... 428/151
See application file for complete search history.

(56) References Cited

U.S. PATENT DOCUMENTS

2020/0154653 A1 5/2020 Lind et al.
2020/0392341 A1 12/2020 Smith et al.
2020/0399824 A1* 12/2020 Stewart ................. D06M 15/03
2021/0381158 A1 12/2021 Stewart et al.

FOREIGN PATENT DOCUMENTS

| CN | 105943509 | 9/2016 |
| CN | 108059735 | 5/2018 |
| CN | 110353143 | 10/2019 |
| CN | 113016965 | 6/2021 |
| WO | 2020/115690 | 6/2020 |
| WO | 2021/136883 | 7/2021 |

OTHER PUBLICATIONS

GB Search Report dated Dec. 7, 2022 for GB application No. GB2208263.0.
(Continued)

*Primary Examiner* — Brent T O'Hern
(74) *Attorney, Agent, or Firm* — EVAN LAW GROUP LLC (57) ABSTRACT

The invention relates to fungal materials comprising fungal biomass, a polysaccharide-based matrix, a plasticiser (e.g. a polyol and/or latex), and an emulsifying agent. The invention also relates to methods of producing said fungal materials, and to uses of said fungal materials.

24 Claims, 2 Drawing Sheets

(56) References Cited

OTHER PUBLICATIONS

International Search Report and Written Opinion dated Aug. 17, 2023 for PCT application No. PCT/GB2023/051473.
GB Search Report dated Aug. 4, 2023 for GB application No. GB2308401.5.
Gurram, R. et al., "A solvent-free approach for production of films from pectin and fungal biomass", Journal of Polymers and the Environment, vol. 26, pp. 4282-4292, (2018).
Deeg, K. et al., "Greener Solutions: Improving performance of mycelium-based leather, final report to MycoWorks", Greener Solutions Fall 2017, pp. 1-54, (2018), found at https://bcgctest.files.wordpress.com/2018/03/gs_2017_mycoworks_finalreport.pdf.
Extended European Search Report dated Apr. 30, 2024 for European application No. 23205050.0-1102/ 4339235, 7 pages.

\* cited by examiner

FUNGAL MATERIALS

FIELD OF THE INVENTION

The invention relates to fungal materials comprising fungal biomass, a polysaccharide-based matrix, a plasticiser (e.g. a polyol and/or latex), and an emulsifying agent. The invention also relates to methods of producing said fungal materials, and to uses of said fungal materials.

BACKGROUND OF THE INVENTION

Despite their acknowledged environmental and ethical impact, there remains a great reliance upon animal-derived products and fossil fuels for the productions of every-day materials, such as leather and plastics. This reliance is due in part to the desirable properties associated with such products, which make them suitable for use in a wide range of applications and industries. Leather, for example, has high tensile strength, is extremely flexible and durable, and is water resistant. Plastics are typically low cost and have excellent durability. However, use of animal-derived and fossil fuel-derived products incurs a significant environmental and ethical cost, not only in their production but also their disposal (for example, many plastics are notoriously difficult to recycle).

In an effort to address the well-recognised problems associated with animal-derived and fossil fuel-derived products, considerable research has been conducted into providing alternative materials which possess similar properties to these existing animal-derived and fossil fuel-derived products. Fungal biomass has been investigated as a potential alternative material due to its versatility and low environmental and ethical impact; but existing fungal-based materials typically fail to achieve sufficient tensile and compressive strength to be widely applicable and are hampered by high levels of water solubility and susceptibility to moisture damage.

There is an urgent and unmet need for alternative materials which are sustainable and biodegradable, and which exhibit properties that make them suitable replacements for animal-derived and fossil fuel-derived products such as leather and plastics. Such alternative materials would reduce the current reliance on animal-derived and fossil fuel-derived products, in turn alleviating environmental impact and ethical concerns.

SUMMARY OF THE INVENTION

The Inventors have overcome the above problems by developing fungal materials which exhibit high tensile strength, high flexibility, and resistance to water damage. Advantageously, the fungal materials of the invention are renewable and biodegradable and are suitable for use in a wide range of applications. In particular, the materials of the invention can be used as leather substitutes, e.g. in the production of upholstery, clothes, shoes, and accessories. The materials of the invention are strong and durable, allowing them to be used in the production of products that are typically made from plastics.

The invention provides a fungal material comprising: (a) fungal biomass; (b) a polysaccharide-based matrix; (c) a plasticiser; (d) an emulsifying agent; and optionally (e) a diluent.

In one embodiment, the plasticiser is a polyol. In one embodiment, the plasticiser comprises a polyol. In one embodiment, the plasticiser comprises a polyol and/or latex. In one embodiment, the plasticiser comprises a polyol and latex. In one embodiment, the plasticiser is latex. In one embodiment, the plasticiser comprises latex.

In one embodiment, the invention provides a fungal material comprising: (a) fungal biomass; (b) a polysaccharide-based matrix; (c) a polyol; (d) an emulsifying agent; and optionally (e) a diluent.

In one embodiment, the fungal material comprises an oil.

In one embodiment, the fungal biomass comprises at least one of fungal fruiting bodies, fungal mat(s), mycelium, and hyphae.

In one embodiment, the fungal material comprises between 10% and 50% w/w fungal biomass.

In one embodiment, the polysaccharide-based matrix is selected from an agarose-based matrix, a carrageenan-based matrix, an alginate-based matrix, a cellulose-based matrix, and a chitosan-based matrix. In one embodiment, the agarose-based matrix is agar. In one embodiment, the fungal material comprises between 0.2% and 8% w/w polysaccharide-based matrix.

In one embodiment, the fungal material comprises between 0.5% and 40% w/w plasticiser.

In one embodiment, the polyol is selected from glycerol, sorbitol, erythritol, xylitol, maltitol, mannitol, lactitol, polyglycitol, and isomalt. In one embodiment, the fungal material comprises between 0.5% and 5% w/w polyol.

In one embodiment, the fungal material comprises between 0.5% and 40% w/w latex.

In one embodiment, the emulsifying agent is selected from lecithin, lanolin, sodium alginate, xanthum gum, pectin, casein, whey protein, ammonium phosphatides, acacia, and oleylamine. In one embodiment, the fungal material comprises between 0.05% and 0.5% w/w emulsifying agent.

In one embodiment, the diluent is selected from water, a buffer solution, or saline solution.

In one embodiment, the oil is selected from sunflower oil, rapeseed oil, castor oil, and olive oil. In one embodiment, the fungal material comprises between 0.1% and 2% w/w oil.

In one embodiment, the fungal material comprises a combined concentration of between 0.15% and 2% w/w oil and emulsifying agent.

In one embodiment, the fungal material further comprises a support material selected from cotton, polyester, nylon, cotton, denim, and/or silk.

In one embodiment, the fungal material comprises agar, glycerol, sunflower oil, and lecithin.

In one embodiment, the fungal material comprises a carrageenan-based matrix, latex, and lecithin.

In one embodiment, the fungal material comprises a colourant. In one embodiment, the fungal material comprises an odorant.

The invention also provides a method of producing a fungal material, the method comprising: (a) combining fungal biomass, a polysaccharide composition, a plasticiser (e.g. a polyol and/or latex), an emulsifying agent and a diluent to produce a fluid mixture, wherein the polysaccharide composition is capable of forming a polysaccharide-based matrix; and (b) solidifying the fluid mixture to produce a fungal material comprising a polysaccharide-based matrix.

In one embodiment, the method comprises combining fungal biomass, a polysaccharide composition, a plasticiser (e.g. a polyol and/or latex), an emulsifying agent, a diluent and an oil.

In one embodiment, the method further comprises melting the polysaccharide composition prior to solidifying the fluid mixture. In one embodiment, melting the polysaccharide composition comprises heating the fluid mixture to a temperature which exceeds the melting temperature of the polysaccharide composition, optionally at least 100° C., optionally for at least 10 seconds.

In one embodiment, the polysaccharide composition is in molten form.

In one embodiment, solidifying the fluid mixture comprises cooling the fluid mixture.

In one embodiment, the method further comprises drying the fungal material, optionally wherein the method comprises drying the fungal material at a temperature of at least 30° C. for at least 2 hours.

In one embodiment, the fungal biomass comprises fungal biomass and a diluent, optionally wherein the diluent is selected from water, a buffer solution, or a saline solution. In one embodiment, the fungal biomass comprises sufficient liquid to be pourable.

In one embodiment, the fungal biomass is homogenised fungal biomass.

In one embodiment, the fungal biomass comprises at least one of fungal fruiting bodies, fungal mat(s), mycelium, and hyphae. In one embodiment, the polysaccharide composition is selected from: (a) a composition comprising agarose capable of forming an agarose-based matrix, optionally wherein the composition is agar powder; (b) a composition comprising carrageenan capable of forming a carrageenan-based matrix; (c) a composition comprising alginate capable of forming an alginate-based matrix; (d) a composition comprising cellulose capable of forming a cellulose-based matrix; and (e) a composition comprising chitosan capable of forming a chitosan-based matrix. In one embodiment, the plasticiser comprises a polyol. In one embodiment, the plasticiser comprises a polyol and/or latex. In one embodiment, the polyol is selected from glycerol, sorbitol, erythritol, xylitol, maltitol, mannitol, lactitol, polyglycitol, and isomalt. In one embodiment, the emulsifying agent is selected from lecithin, lanolin, sodium alginate, xanthum gum, pectin, casein, whey protein, ammonium phosphatides, acacia, and oleylamine. In one embodiment, the diluent is selected from water, a buffer solution and saline solution.

In one embodiment, the fluid mixture comprises: (i) between 10% and 50% fungal biomass; (ii) between 0.2% and 8% w/v of the polysaccharide-based matrix; (iii) between 0.5% and 40% v/v of the plasticiser; and (iv) between 0.05% and 0.5% v/v of the emulsifying agent.

In one embodiment, the plasticiser comprises a polyol and the fluid mixture comprises: (i) between 10% and 50% fungal biomass; (ii) between 0.2% and 8% w/v of the polysaccharide-based matrix; (iii) between 0.5% and 5% v/v of the polyol; and (iv) between 0.05% and 0.5% v/v of the emulsifying agent.

In one embodiment, the plasticiser comprises latex and the fluid mixture comprises: (i) between 10% and 50% fungal biomass; (ii) between 0.2% and 8% w/v of the polysaccharide-based matrix; (iii) between 0.5% and 40% v/v of the latex; and (iv) between 0.05% and 0.5% v/v of the emulsifying agent.

In one embodiment: (i) the oil is selected from sunflower oil, rapeseed oil, castor oil, and olive oil; and/or (ii) the fluid mixture comprises between 0.1 and 2% v/v oil.

In one embodiment, the method further comprises adhering the fungal material to: (i) a support material selected from cotton, polyester, nylon, cotton, denim, and/or silk; and/or (ii) one or more additional fungal materials.

In one embodiment, the method comprises adding a colourant to the fluid mixture. In one embodiment, the method comprises adding an odorant to the fluid mixture.

The invention also provides a fungal material produced by a method of the invention.

The invention also provides use of the fungal material of the invention as a leather substitute. The invention also provides use of the fungal material of the invention as a plastic substitute. The invention also provides use of the fungal material of the invention as a rubber substitute. The invention also provides use of the fungal material of the invention as an insulation material. The invention also provides use of the fungal material of the invention as a packaging material.

The invention also provides use of the fungal material of the invention as a foodstuff, optionally wherein the foodstuff is a pet food.

The invention also provides a leather substitute comprising the fungal material of the invention. The invention also provides a plastic substitute comprising the fungal material of the invention. The invention also provides a rubber substitute comprising the fungal material of the invention. The invention also provides an insulation material comprising the fungal material of the invention. The invention also provides a packaging material comprising the fungal material of the invention.

The invention also provides a foodstuff comprising the fungal material of the invention, optionally wherein the foodstuff is a pet food.

DETAILED DESCRIPTION OF THE INVENTION

The present invention is based on the surprising discovery that the combination of: (a) fungal biomass; (b) a polysaccharide-based matrix; (c) a plasticiser (e.g. a polyol and/or latex); and (d) an emulsifying agent provides a fungal material which is a viable alternative to animal-derived and fossil fuel-derived products such as leather and plastic; and is also environmentally friendly and ethical.

A further advantage of fungal materials of the invention is that they may be easily customised to suit a particular application. For example, fungal materials of the invention comprise a polysaccharide-based matrix, the concentration of which may be easily adjusted to increase or decrease structural integrity, rigidity and tensile strength. Fungal materials of the invention further comprise a plasticiser (e.g. a polyol and/or latex), which achieves a high degree of flexibility.

Although the inclusion of a plasticiser (e.g. a polyol and/or latex) confers improved flexibility to the fungal material, it also increases susceptibility to water damage. The inventors unexpectedly overcame this challenge by further incorporating an emulsifying agent and/or oil into the fungal material mitigates the negative effects associated with incorporation of the plasticiser (e.g. polyol and/or latex). Fungal materials of the invention therefore enjoy increased flexibility as well as enhanced resistance to water damage.

Without wishing to be bound by theory, the Inventors believe that the emulsifying agent promotes plasticiser (e.g. polyol and/or latex) retention by the fungal material thereby avoiding leaching of the plasticiser (e.g. polyol and/or latex) upon contact with water, and ensuring that the fungal material can resist water damage.

Advantageously, the Inventors have found that inclusion of latex further improves both the flexibility and the tensile strength of the fungal material. Fungal materials comprising latex exhibit further increased resistance to tearing which further increases the suitability of the fungal materials in a range of applications. For example, increased resistance to tearing ensures the fungal material can be cut and sewn to produce various products such as upholstery, clothes, shoes, and accessories. Fungal materials comprising latex are also less susceptible to contamination and exhibit reduced drying time. Furthermore, the Inventors have found that incorporation of latex enhances the adhesive properties of the fungal material over time, thereby further improving the longevity of products made from such materials. The properties of the fungal material, such as flexibility, elasticity and tensile strength, can be further optimised for a given application by changing the type of latex used. For example, fungal materials comprising cross-linked latex typically exhibit increased flexibility, elasticity and tensile strength, as compared to fungal materials comprising uncross-linked latex of the same type.

Thus, the fungal materials of the invention exhibit high tensile strength and flexibility, while also being resistant to water damage. These desirable properties enable the fungal materials of the invention to be used in a wide range of applications. The fungal materials of the invention share several of the advantageous properties of leather, e.g. high tensile strength, durability, flexibility, and water resistance, making these materials particularly well suited for use as leather substitutes. The advantageous properties of the fungal materials of the invention also enable these materials to be used in various applications which currently rely on plastic-based products. Importantly, the fungal materials of the invention also have a significantly lower environmental impact than animal-based products, such as leather, and plastic-based products.

The fungal material of the invention comprises fungal biomass, a polysaccharide-based matrix, a plasticiser (e.g. a polyol and/or latex), and an emulsifying agent. In some embodiments, the fungal material comprises a diluent. In some embodiments, the fungal material further comprises an oil.

The fungal biomass may be any biomass comprising fungal cells. In some embodiments, the fungal biomass is derived from an Ascomycota or a Basidiomycota. In some embodiments, the fungal biomass is derived from a member of a genus selected from *Agaricus, Boletus, Craterellus, Cantharellus, Lentinellus, Pleurotus, Hericium, Grifola, Fistulina, Fomes, Fomitopsis, Inonotus, Trametes Ganoderma, Morchella, Cordyceps, Aspergillus, Penicillium, Acremonium,* and *Fusarium*. In some embodiments, the fungal biomass is derived from a fungus selected from *Agaricus bisporus, Boletus edulis, Catharellus cibarius, Pleurotus ostreatus, Pleurotus eryngii, Hericium erinaceus, Grifola frondosa, Fistulina hepatica, Fomes fomentarius, Fomitopsis pinicola, Inonotus obliquus, Trametes versicolor, Ganoderma applanatum,* and *Ganoderma lucidum*. In some embodiments, the fungal biomass comprises fungal cells from a single strain of fungus. In some embodiments, the fungal biomass comprises fungal cells from two or more strains of fungi.

The fungal biomass typically comprises at least one of fungal fruiting bodies, fungal mat(s), mycelium, and hyphae.

Fungal mats, which may also be referred to as fungal biofilms, typically comprise a large number of fungal cells encased within an extracellular matrix. This extracellular matrix typically includes a combination of macromolecules, such as polysaccharides, proteins, nucleic acids, and lipids, and contributes to various functions including cell and surface adhesion.

In some embodiments, the fungal biomass is homogenised fungal biomass. Homogenised fungal biomass typically comprises a mixture of fungal biomass and a diluent, that has been physically agitated to evenly distribute the fungal biomass throughout the mixture. For example, homogenised fungal biomass may be produced by mixing fungal biomass with a diluent and blending the mixture to produce a substantially homogeneous mixture.

In some embodiments, the homogenised fungal biomass comprises approximately 1 part fungal biomass (by weight) and approximately 1 part diluent (by volume). In some embodiments, the fungal biomass comprises 1 part fungal biomass and 2 parts diluent. In some embodiments, the fungal biomass comprises 1 part fungal biomass and 3 parts diluent. In some embodiments, the fungal biomass comprises 2 parts fungal biomass and 1 part diluent. In some embodiments, the fungal biomass comprises 3 parts fungal biomass and 1 part diluent.

In some embodiments, the fungal material comprises between 10% and 70% w/w (weight by weight) fungal biomass. In some embodiments, the fungal material comprises between 10% and 60% w/w fungal biomass, between 20% and 60% w/w fungal biomass, between 20% and 50% w/w fungal biomass, between 30% and 50% w/w fungal biomass, between 30% and 40% w/w fungal biomass, or between 25% and 30% w/w fungal biomass.

In some embodiments, the fluid mixture comprises fungal material between 10% and 70% w/v fungal biomass. In some embodiments, the fungal material comprises between 10% and 60% w/v fungal biomass, between 20% and 60% w/v fungal biomass, between 20% and 50% w/v, between 30% and 50% w/v fungal biomass, between 30% and 40% w/v fungal biomass or between 25% and 30% w/v fungal biomass.

Advantageously, the polysaccharide-based matrix provides the fungal material with additional structural rigidity and increased tensile strength. As used herein, a "polysaccharide-based matrix" refers to a network formed by cross-linked polysaccharide molecules. The polysaccharide-based matrix typically encapsulates the fungal biomass. In some embodiments, the polysaccharide-based matrix is selected from an agarose-based matrix, an alginate-based matrix, a cellulose-based matrix, a carrageenan-based matrix, and a chitosan-based matrix. In some embodiments, the agarose-based matrix is agar.

In some embodiments, the fungal material comprises at least 0.1%, at least 0.2%, at least 0.3%, at least 0.4%, at least 0.5%, at least 0.75%, at least 1%, at least 1.25%, at least 1.5%, at least 1.75%, at least 2%, at least 2.5%, at least 3%, at least 3.5%, at least 4%, at least 4.5%, at least 5%, at least 6%, at least 7%, at least 8%, at least 9%, or at least 10% w/w polysaccharide-based matrix. In some embodiments, the fungal material comprises up to 5% w/w polysaccharide-based matrix. In some embodiments, the fungal material comprises between 0.5% and 5% w/w polysaccharide-based matrix.

In some embodiments, such as when the fungal material is dry, the fungal material comprises 5% and 50% w/w polysaccharide-based matrix. In some embodiments, the fungal material comprises between 5% and 45% w/w polysaccharide-based matrix, between 5% and 40% w/w polysaccharide-based matrix, between 5% and 35% w/w polysaccharide-based matrix, between 5% and 30% w/w polysaccharide-based matrix, between 5% and 25% w/w polysaccharide-based matrix, between 5% and 20% w/w polysaccharide-based matrix, between 10% and 45% w/w polysaccharide-based matrix, between 10% and 40% w/w polysaccharide-based matrix, between 10% and 35% w/w polysaccharide-based matrix, between 10% and 30% w/w polysaccharide-based matrix, between 10% and 25% w/w polysaccharide-based matrix, between 10% and 20% w/w polysaccharide-based matrix, between 15% and 45% w/w polysaccharide-based matrix, between 15% and 40% w/w polysaccharide-based matrix, between 15% and 35% w/w polysaccharide-based matrix, between 15% and 30% w/w polysaccharide-based matrix, between 15% and 25% w/w polysaccharide-based matrix, or between 15% and 20% w/w polysaccharide-based matrix.

In some embodiments, the fungal material is produced from a fluid mixture comprising at least 0.1%, at least 0.2%, at least 0.3%, at least 0.4%, at least 0.5%, at least 0.75%, at least 1%, at least 1.25%, at least 1.5%, at least 1.75%, at least 2%, at least 2.5%, at least 3%, at least 3.5%, at least 4%, at least 4.5%, at least 5%, at least 6%, at least 7%, at least 8%, at least 9%, or at least 10% w/v (weight by volume) polysaccharide-based matrix. In some embodiments, the fungal material is produced from a fluid mixture comprising up to 5% w/v polysaccharide-based matrix. In some embodiments, the fungal material is produced from a fluid mixture comprising between 0.5% and 5% w/v polysaccharide-based matrix.

The skilled person will readily understand that the structural rigidity of the fungal material can be optimised for various applications by altering the concentration of the polysaccharide-based matrix. For example, for applications requiring a high degree of structural rigidity, a high polysaccharide-based matrix concentration is preferable, e.g. at least 3% w/w polysaccharide-based matrix, or at least 5% w/w polysaccharide-based matrix. Alternatively, for applications requiring a low degree of structural rigidity, a low polysaccharide-based matrix concentration is preferable, e.g. up to 1% w/w polysaccharide-based matrix.

Tensile strength may be measured by indexing a material's ultimate load to its cross-sectional area. Tensile strength is typically measured in Pascals (Pa). The ultimate load of a material may be measured using any suitable method known in the art, e.g. a universal testing machine (UTM). For example, the ultimate load of a material may be tested by placing the material between grips of a UTM and applying a tensile force to the material until it ruptures. The ultimate load is the ultimate tensile force the material is able to withstand before rupturing.

The inclusion of a plasticiser (e.g. a polyol and/or latex) provides the fungal material with enhanced flexibility relative to the corresponding fungal material in the absence of a plasticiser (e.g. a polyol and/or latex). Advantageously, the degree of flexibility may be optimised by adjusting the amount of plasticiser (e.g. polyol and/or latex) in the material, wherein an increased amount of plasticiser (e.g. polyol and/or latex) typically increases the flexibility of the material. The plasticiser (e.g. polyol and/or latex) also provides the fungal material with improved aesthetic qualities and a softer feel.

It will be understood that references herein to "plasticiser" embrace any component that increases the flexibility of a fungal material as compared to the flexibility of a fungal material which does not contain plasticiser. Exemplary plasticisers for use in the invention include, but are not limited to, latex, polyols, glycerin, and phthalate-based plasticisers, such as butyl benzyl phthalate (benzyl butyl phthalate, BBzP) or Di-n-butyl phthalate (DBP), and combinations thereof.

In some embodiments, the fungal material comprises at least 0.5%, at least 1%, at least 2%, at least 3%, at least 4%, at least 5%, at least 10%, at least 15%, at least 20%, at least 25%, at least 30%, at least 35%, or at least 40% w/w plasticiser. In some embodiments, the fungal material comprises up to 40% w/w plasticiser. In some embodiments, the fungal material comprises between 0.5% and 40% w/w plasticiser. In some embodiments, the fungal material comprises between 2% and 40% w/w plasticiser. In some embodiments, the fungal material comprises between 2% and 35% w/w, between 2% and 30% w/w, between 2% and 25% w/w, between 2% and 20% w/w, between 2% and 15% w/w, between 2% and 10% w/w, between 5% and 35% w/w, between 5% and 30% w/w, between 5% and 25% w/w, between 5% and 20% w/w, between 5% and 15% w/w, between 5% and 10% w/w, between 10% and 35% w/w, between 10% and 30% w/w, between 10% and 25% w/w, between 10% and 20% w/w or between 10% and 15% w/w plasticiser.

In some embodiments, the fungal material is produced from a fluid mixture comprising at least 0.5%, at least 1%, at least 2%, at least 3%, at least 4%, at least 5%, at least 10%, at least 15%, at least 20%, at least 25%, at least 30%, at least 35%, or at least 40% v/v (volume by volume) plasticiser. In some embodiments, the fungal material is produced from a fluid mixture comprising up to 40% v/v plasticiser. In some embodiments, the fungal material is produced from a fluid mixture comprising between 0.5% and 5% v/v plasticiser. In some embodiments, the fungal material is produced from a fluid mixture comprising at least 0.5%, at least 1%, at least 2%, at least 3%, at least 4%, at least 5%, at least 10%, at least 15%, at least 20%, at least 25%, at least 30%, at least 35%, or at least 40% w/v (weight by volume) plasticiser. In some embodiments, the fungal material is produced from a fluid mixture comprising up to 40% w/v plasticiser. In some embodiments, the fungal material is produced from a fluid mixture comprising between 0.5% and 5% w/v plasticiser.

In some embodiments, the plasticiser comprises a polyol. In some embodiments, the plasticiser comprises a polyol and/or latex. In some embodiments, the plasticiser comprises a polyol and latex. In some embodiments, the plasticiser comprises latex.

In some embodiments, the polyol is selected from glycerol, sorbitol, erythritol, xylitol, maltitol, mannitol, lactitol, polyglycitol, and isomalt.

In some embodiments, the fungal material comprises at least 0.5%, at least 0.6%, at least 0.7%, at least 0.8%, at least 0.9%, at least 1%, at least 1.25%, at least 1.5%, at least 1.75%, at least 2%, at least 2.5%, at least 3%, at least 3.5%, at least 4%, at least 4.5%, or at least 5% w/w polyol. In some embodiments, the fungal material comprises up to 5% w/w polyol. In some embodiments, the fungal material comprises between 0.5% and 5% w/w polyol. In some embodiments, the fungal material comprises between 2% and 40% w/w polyol. In some embodiments, the fungal material comprises between 2% and 35% w/w, between 2% and 30% w/w, between 2% and 25% w/w, between 2% and 20% w/w, between 2% and 15% w/w, between 2% and 10% w/w, between 5% and 35% w/w, between 5% and 30% w/w, between 5% and 25% w/w, between 5% and 20% w/w, between 5% and 15% w/w, between 5% and 10% w/w, between 10% and 35% w/w, between 10% and 30% w/w, between 10% and 25% w/w, between 10% and 20% w/w or between 10% and 15% w/w polyol.

In some embodiments, the fungal material is produced from a fluid mixture comprising at least 0.5%, at least 0.6%, at least 0.7%, at least 0.8%, at least 0.9%, at least 1%, at least 1.25%, at least 1.5%, at least 1.75%, at least 2%, at least 2.5%, at least 3%, at least 3.5%, at least 4%, at least 4.5%, or at least 5% v/v (volume by volume) polyol. In some embodiments, the fungal material is produced from a fluid mixture comprising up to 5% v/v polyol. In some embodiments, the fungal material is produced from a fluid mixture comprising between 0.5% and 5% v/v polyol.

In some embodiments, the latex comprises natural latex rubber. In some embodiments, the latex comprises a synthetic latex. In some embodiments, the latex is liquid latex. In some embodiments, the latex is cross-linked latex. In some embodiments, the latex is vulcanised latex. In some embodiments, the latex comprises a cross-linking agent. In some embodiments, the latex comprises a vulcanising agent, such as sulphur or a metal oxide.

In some embodiments, the fungal material comprises at least 0.5%, at least 1%, at least 2%, at least 3%, at least 4%, at least 5%, at least 10%, at least 15%, at least 20%, at least 25%, at least 30%, at least 35%, or at least 40% w/w latex. In some embodiments, the fungal material comprises up to 40% w/w latex. In some embodiments, the fungal material comprises between 0.5% and 40% w/w latex. In some embodiments, the fungal material comprises between 2% and 40% w/w latex. In some embodiments, the fungal material comprises between 2% and 35% w/w, between 2% and 30% w/w, between 2% and 25% w/w, between 2% and 20% w/w, between 2% and 15% w/w, between 2% and 10% w/w, between 5% and 35% w/w, between 5% and 30% w/w, between 5% and 25% w/w, between 5% and 20% w/w, between 5% and 15% w/w, between 5% and 10% w/w, between 10% and 35% w/w, between 10% and 30% w/w, between 10% and 25% w/w, between 10% and 20% w/w or between 10% and 15% w/w latex.

In some embodiments, the fungal material is produced from a fluid mixture comprising at least 0.5%, at least 1%, at least 2%, at least 3%, at least 4%, at least 5%, at least 10%, at least 15%, at least 20%, at least 25%, at least 30%, at least 35%, or at least 40% w/v latex. In some embodiments, the fungal material is produced from a fluid mixture comprising up to 40% w/v latex. In some embodiments, the fungal material is produced from a fluid mixture comprising between 0.5% and 40% w/v latex.

Advantageously, the emulsifying agent increases the retention of plasticiser (e.g. polyol) by the fungal material, thereby achieving flexibility without exhibiting an increased susceptibility to water damage. Particularly advantageously, the emulsifying agent ensures that the plasticiser (e.g. polyol) is substantially retained by the fungal material, even when the fungal material comes into contact with liquids such as water. The emulsifying agent may be any agent that stabilises a mixture of immiscible liquids. In some embodiments, the emulsifying agent is selected from lecithin, lanolin, sodium alginate, xanthum gum, pectin, casein, whey protein, ammonium phosphatides, acacia, and oleylamine.

In some embodiments, the fungal material comprises at least 0.05%, at least 0.1%, at least 0.2%, at least 0.3%, at least 0.4%, at least 0.5%, at least 0.75%, at least 1%, at least 2%, at least 3%, at least 4%, or at least 5% w/w emulsifying agent. In some embodiments, the fungal material comprises up to 5% w/w emulsifying agent. In some embodiments, the fungal material comprises between 0.05% and 5% w/w emulsifying agent. In some embodiments, the fungal material comprises between 5% and 30% w/w emulsifying agent. In some embodiments, the fungal material comprises between 5% and 25% w/w, between 5% and 20% w/w, between 5% and 15% w/w, between 5% and 10% w/w, between 10% and 30% w/w, between 10% and 25% w/w, between 10% and 20% w/w, between 10% and 15% w/w, between 15% and 30% w/w, between 15% and 25% w/w, between 15% and 20% w/w or between 20% and 30% w/w emulsifying agent.

In some embodiments, the fungal material is produced from a fluid mixture comprising at least 0.05%, at least 0.1%, at least 0.2%, at least 0.3%, at least 0.4%, at least 0.5%, at least 0.75%, at least 1%, at least 2%, at least 3%, at least 4%, or at least 5% w/v emulsifying agent. In some embodiments, the fungal material is produced from a fluid mixture comprising up to 5% w/v emulsifying agent. In some embodiments, the fungal material is produced from a fluid mixture comprising between 0.05% and 5% w/v emulsifying agent. In some embodiments, the fungal material is produced from a fluid mixture comprising at least 0.05%, at least 0.1%, at least 0.2%, at least 0.3%, at least 0.4%, at least 0.5%, at least 0.75%, at least 1%, at least 2%, at least 3%, at least 4%, or at least 5% v/v emulsifying agent. In some embodiments, the fungal material is produced from a fluid mixture comprising up to 5% v/v emulsifying agent. In some embodiments, the fungal material is produced from a fluid mixture comprising between 0.05% and 5% v/v emulsifying agent.

In some embodiments, the fungal material further comprises an oil. Advantageously, inclusion of an oil enhances the ability of the fungal material to repel water, thereby resisting water damage. In some embodiments, the oil is selected from sunflower oil, rapeseed oil, castor oil, and olive oil. Particularly advantageously, the emulsifying agent acts to enhance oil retention by the fungal material thereby avoiding the development of an oily appearance.

In some embodiments, the fungal material comprises at least 0.1%, at least 0.2%, at least 0.3%, at least 0.4%, at least 0.5%, at least 0.75%, at least 1%, at least 1.25%, at least 1.5%, at least 1.75%, at least 2%, at least 3%, at least 4%, or at least 5% w/w oil. In some embodiments, the fungal material comprises up to 5% w/w oil. In some embodiments, the fungal material comprises between 0.1% and 5% w/w oil.

In some embodiments, the fungal material is produced from a fluid mixture comprising at least 0.1%, at least 0.2%, at least 0.3%, at least 0.4%, at least 0.5%, at least 035%, at least 1%, at least 1.25%, at least 1.5%, at least 1.75%, at least 2%, at least 3%, at least 4%, or at least 5% v/v oil. In some embodiments, the fungal material is produced from a fluid mixture comprising up to 5% v/v oil. In some embodiments, the fungal material is produced from a fluid mixture comprising between 0.1% and 5% v/v oil.

In some embodiments, the fungal material comprises a combined concentration of at least 0.15%, at least 0.2%, at least 0.3%, at least 0.4%, at least 0.5%, at least 0.75%, at least 1%, at least 1.25%, at least 1.5%, at least 1.75%, at least 2%, at least 3%, at least 4%, or at least 5% w/w oil and emulsifying agent. In some embodiments, the fungal material comprises a combined concentration of up to 5% w/w oil and emulsifying agent. In some embodiments, the fungal material comprises a combined concentration of between 0.15% and 5% w/w oil and emulsifying agent.

In some embodiments, the fungal material is produced from a fluid mixture comprising a combined concentration of at least 0.15%, at least 0.2%, at least 0.3%, at least 0.4%, at least 0.5%, at least 0.75%, at least 1%, at least 1.25%, at least 1.5%, at least 1.75%, at least 2%, at least 3%, at least 4%, or at least 5% v/v oil and emulsifying agent. In some embodiments, the fungal material is produced from a fluid mixture comprising a combined concentration of up to 5% v/v oil and emulsifying agent. In some embodiments, the fungal material is produced from a fluid mixture comprising a combined concentration of between 0.15% and 5% v/v oil and emulsifying agent.

In some embodiments, the fungal material comprises agar, glycerol, and lecithin. In some embodiments, the fungal material comprises between 0.5% and 5% w/w agar, between 0.5% and 5% w/w glycerol, and between 0.05% and 5% w/w lecithin. In some embodiments, the fungal material comprises 1% w/w agar, 1% w/w glycerol, and 1% w/w lecithin.

In some embodiments, the fungal material is produced from a fluid mixture comprising agar, glycerol, and lecithin. In some embodiments, the fungal material is produced from a fluid mixture comprising between 0.5% and 5% w/v agar, between 0.5% and 5% v/v glycerol, and between 0.05% and 5% w/v lecithin. In some embodiments, the fungal material is produced from a fluid mixture comprising 1% w/v agar, 1% v/v glycerol, and 1% w/v lecithin.

In some embodiments, the fungal material comprises agar, glycerol, sunflower oil, and lecithin. In some embodiments, the fungal material comprises between 0.5% and 5% w/w agar, between 0.5% and 5% w/w glycerol, between 0.1% and 2% w/w sunflower oil, and between 0.05% and 5% w/w lecithin. In some embodiments, the fungal material comprises 1% w/w agar, 1% w/w glycerol, 2% w/w sunflower oil, and 1% w/w lecithin.

In some embodiments, the fungal material is produced from a fluid mixture comprising agar, glycerol, sunflower oil, and lecithin. In some embodiments, the fungal material is produced from a fluid mixture comprising between 0.5% and 5% w/v agar, between 0.5% and 5% v/v glycerol, between 0.1% and 2% v/v sunflower oil, and between 0.05% and 5% w/v lecithin. In some embodiments, the fungal material is produced from a fluid mixture comprising 1% w/v agar, 1% v/v glycerol, 2% v/v sunflower oil, and 1% w/v lecithin.

In some embodiments, the fungal material is produced from a fluid mixture comprising agar, glycerol, rapeseed oil, and lecithin. In some embodiments, the fungal material is produced from a fluid mixture comprising between 0.5% and 5% w/v agar, between 0.5% and 5% v/v glycerol, between 0.1% and 2% v/v rapeseed oil, and between 0.05% and 5% w/v lecithin. In some embodiments, the fungal material is produced from a fluid mixture comprising 1% w/v agar, 1% v/v glycerol, 2% v/v rapeseed oil, and 1% w/v lecithin.

The skilled person will readily understand that, when combined, the components of the fungal material add up to 100%. The balance between specified components and 100% is typically made up by the diluent. Weight by weight (w/w) indicates the proportion of a given component as measured by weight, e.g. 1% w/w indicates a concentration of 1 g per 100 g material. Weight by volume (w/v) indicates the proportion of a given component in weight relative to the volume of the solution, e.g. 1% w/v indicates a concentration of 1 g per 100 ml solution. Volume by volume (v/v) indicates the proportion of a given component as measured by volume, e.g. 1% v/v indicates a concentration of 1 ml per 100 ml solution. Unless specified otherwise, w/w, w/v and v/v values refer to concentrations present in the fluid mixture and correspondingly in the solidified fungal material prior to drying. It will be appreciated that drying the fungal material will increase the w/w, w/v and v/v values inversely proportional to the weight or volume of diluent lost during drying. Drying typically results in approximately 95% loss of diluent weight.

In some embodiments, the fungal material comprises less than 5% diluent, such as less than 5%, less than 4%, less than 3%, less than 2%, less than 1% diluent. In some embodiments, the fungal material does not comprise diluent.

The diluent may be any liquid that is suitable for dissolving the polysaccharide composition. The diluent is typically an aqueous diluent. Suitable diluents include, but are not limited to, water, a buffer solution, or saline solution. Buffer solutions include, but are not limited to, Tris-buffer, HEPES buffer, MOPS buffer, MES buffer, BES buffer, and PIPES buffer. In some embodiments, moisture within the fungal biomass (which is typically aqueous moisture) contributes to the diluent content of the fluid mixture. In some embodiments (e.g. wherein the fungal biomass has a high water content), moisture within the fungal biomass contributes to at least 10% of the total diluent within the fluid mixture (e.g. at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95% of the total diluent within the fluid mixture). In some embodiments, moisture within the fungal biomass provides the entire diluent content of the fluid mixture. The plasticiser (e.g. polyol and/or latex) and the oil do not typically contribute to the % diluent content of the fluid mixture.

In some embodiments, the fungal material further comprises a support material. In some embodiments, the support material is selected from cotton, hemp, polyester, nylon, denim, and/or silk. The fungal material may be adhered to the support material, e.g. by an adhesive. In some embodiments, the fungal material surrounds the support material.

In some embodiments, the fungal material comprises a colourant. In some embodiments, the colourant is a dye or a pigment. In some embodiments, the colourant comprises a mica powder. In some embodiments, the colourant is a whitener such as titanium dioxide.

In some embodiments, the fungal material comprises an odorant. In some embodiments, the odorant is an essential oil or a chemical odorant.

In some embodiments, the fungal material comprises a composite of two or more fungal materials. In some embodiments, the fungal material comprises a composite of at least 3, at least 4, at least 5, at least 6, at least 7, at least 8, at least 9, at least 10, at least 15, or at least 20 fungal materials. In some embodiments, the fungal material comprises a composite of two or more fungal materials and one or more layers of support material. In some embodiments, the fungal material comprises a composite of two or more fungal materials, wherein each fungal material is separated by a layer of support material.

The invention provides use of the fungal material of the invention as a leather substitute. The invention also provides a leather substitute comprising the fungal material of the invention. The invention further provides products comprising the fungal material of the invention or the leather substitute of the invention. In some embodiments, the product is selected from upholstery, an article of clothing, an accessory, and footwear, or a material for use in the automotive industry.

The invention provides use of the fungal material of the invention as a plastic substitute. The invention also provides a plastic substitute comprising the fungal material of the invention.

The invention also provides use of the fungal material of the invention as a rubber substitute. The invention also provides a rubber substitute comprising the fungal material of the invention.

The invention also provides use of the fungal material of the invention as an insulation material. The invention also provides an insulation material comprising the fungal material of the invention.

The invention also provides use of the fungal material of the invention as a packaging material. The invention also provides a packaging material comprising the fungal material of the invention.

The invention further provides use of the fungal material of the invention as a foodstuff. The invention also provides a foodstuff comprising the fungal material of the invention. The foodstuff may be a jerky-type food stuff and/or a sweet foodstuff, e.g. a chewy sweet. In some embodiments, the foodstuff further comprises one or more additional edible components e.g. flavourings and/or sweeteners. In some embodiments, the foodstuff is a pet food, e.g. a dog treat.

The invention provides a method of producing a fungal material, the method comprising: (a) combining fungal biomass, a polysaccharide composition, a plasticiser (e.g. polyol and/or latex), an emulsifying agent and a diluent to produce a fluid mixture, wherein the polysaccharide composition is capable of forming a polysaccharide-based matrix; and (b) solidifying the fluid mixture to produce a fungal material comprising a polysaccharide-based matrix.

In some embodiments, the method comprises combining fungal biomass, a polysaccharide composition, a plasticiser (e.g. a polyol and/or latex), an emulsifying agent, a diluent and an oil.

The fungal biomass, polysaccharide composition, plasticiser (e.g. polyol and/or latex), emulsifying agent, diluent, and optionally the oil, may be combined in any order to provide the fluid mixture.

In some embodiments, the fungal biomass is provided to the mixture in combination with diluent e.g. in the form of homogenised fungal biomass. In some embodiments, the polysaccharide composition is provided to the mixture in combination with diluent e.g. in the form of solubilised polysaccharide composition.

In some embodiments, the method further comprises melting the polysaccharide composition before the fluid mixture is solidified. In some embodiments, melting the polysaccharide composition comprises heating the fluid mixture to a temperature which exceeds the melting temperature of the polysaccharide composition. In some embodiments, the fluid mixture is heated to a temperature of at least 70° C., at least 75° C., at least 80° C., at least 85° C., at least 90° C., at least 95° C., at least 100° C., at least 105° C., at least 110° C., at least 115° C., at least 120° C., at least 125° C., at least 130° C., at least 140° C., or at least 150° C. In some embodiments, melting the polysaccharide composition comprises heating the fluid mixture for at least 10 seconds, at least 20 seconds, at least 30 seconds, at least 40 seconds, at least 50 seconds, at least 1 minute, at least 2 minutes, at least 3 minutes, at least 4 minutes, at least minutes, at least 10 minutes, at least 15 minutes, at least 20 minutes, at least 25 minutes, at least minutes, or at least 1 hour. In some embodiments, melting the polysaccharide composition comprises heating the fluid mixture to at least 90° C. for at least 10 seconds. In some embodiments, melting the polysaccharide composition comprises heating the fluid mixture to at least 100° C. for at least 10 seconds. In some embodiments, the fluid mixture is physically agitated during and/or after heating, e.g. by stirring or shaking.

In some embodiments, the polysaccharide composition is in molten form when combined with the fungal biomass.

In some embodiments, solidifying the fluid mixture comprises allowing the fluid mixture to cool. In some embodiments, solidifying the fluid mixture comprises allowing the fluid mixture to cool to less than 40° C., less than 35° C., less than 30° C., less than 25° C., or less than 20° C.

In some embodiments, the method further comprises drying the fungal material. In some embodiments, the method comprises drying the fungal material at a temperature of at least 30° C., at least 40° C., at least 50° C., at least 60° C., least 70° C., at least 80° C., at least 90° C., or at least 100° C. In some embodiments, the method comprises drying the fungal material for at least 10 minutes, at least 15 minutes, at least 20 minutes, at least 25 minutes, at least 30 minutes, at least 1 hour, at least 2 hours, at least 3 hours, at least 4 hours, at least 6 hours, at least 12 hours, at least 18 hours, at least 24 hours, at least 36 hours, or at least 48 hours. In some embodiments, the method comprises drying the fungal material at a temperature of at least 30° C. for at least 2 hours. In some embodiments, the method comprises drying the fungal material at a temperature of at least 30° C. for at least 24 hours. In some embodiments, the method comprises drying the fungal material at a temperature of at least 30° C. for at least 48 hours. In some embodiments, the method comprises drying the fungal material at a temperature of at least 40° C. for at least 2 hours. In some embodiments, the method comprises drying the fungal material at a temperature of at least 40° C. for at least 24 hours. In some embodiments, the method comprises drying the fungal material at a temperature of at least 40° C. for at least 48 hours. In some embodiments, the method comprises drying the fungal material at a temperature of at least for at least 2 hours. In some embodiments, the method comprises drying the fungal material at a temperature of at least 60° C. for at least 24 hours. In some embodiments, the method comprises drying the fungal material at a temperature of at least 60° C. for at least 48 hours.

In some embodiments, the method further comprises drying the fungal material, optionally wherein the method comprises drying the fungal material at a temperature of at least 30° C. for at least 2 hours.

In some embodiments, the fungal biomass is formulated with a diluent. In some embodiments, the fungal biomass is formulated with sufficient diluent to be pourable.

In some embodiments, the fungal biomass comprises homogenised fungal biomass. In some embodiments, the method comprises homogenising the fungal biomass. Fungal biomass may be homogenised using any suitable method known in the art. For example, by vigorously mixing fungal biomass with a diluent, e.g. using a blender, or by grinding fungal biomass.

The fungal biomass, plasticiser (e.g. polyol and/or latex), oil, and emulsifying agent may be as described above. In some embodiments, the fungal biomass comprises at least one of fungal fruiting bodies, fungal mat(s), mycelium, and hyphae. In some embodiments, the plasticiser comprises a polyol. In some embodiments, the plasticiser comprises a polyol and/or latex. In some embodiments, the polyol is selected from glycerol, sorbitol, erythritol, xylitol, maltitol, mannitol, lactitol, polyglycitol, and isomalt. In some embodiments, the emulsifying agent is selected from lecithin, lanolin, sodium alginate, xanthum gum, pectin, casein, whey protein, ammonium phosphatides, acacia, and oleylamine. In some embodiments, the oil is selected from sunflower oil, rapeseed oil, castor oil, and olive oil.

The polysaccharide composition may be any composition comprising polysaccharide(s) that is capable of forming a polysaccharide-based matrix. In some embodiments, the polysaccharide composition comprises agarose and is capable of forming an agarose-based matrix. In some embodiments, the composition comprises agar powder. In some embodiments, the polysaccharide composition comprises alginate and is capable of forming an alginate-based matrix. In some embodiments, the polysaccharide composition comprises alginate powder. In some embodiments, the polysaccharide composition comprises cellulose and is capable of forming a cellulose-based matrix. In some embodiments, the polysaccharide composition comprises methylcellulose powder. In some embodiments, the polysaccharide composition comprises carrageenan and is capable of forming a carrageenan-based matrix. In some embodiments, the polysaccharide composition comprises carrageenan powder. In some embodiments, the polysaccharide composition comprises chitosan and is capable of forming a chitosan-based matrix. In some embodiments, the polysaccharide composition comprises chitosan powder.

In some embodiments, the fluid mixture comprises at least 10%, at least 15%, at least 20%, at least 25%, at least 30%, at least 35%, at least 40%, at least 45%, or at least 50% w/v fungal material.

In some embodiments, the fluid mixture comprises at least 0.1%, at least 0.2%, at least 0.3%, at least at least 0.5%, at least 0.75%, at least 1%, at least 1.25%, at least 1.5%, at least 1.75%, at least 2%, at least 2.5%, at least 3%, at least 3.5%, at least 4%, at least 4.5%, at least 5%, at least 6%, at least 7%, at least 8%, at least 9%, or at least 10% w/v polysaccharide composition. In some embodiments, the fluid mixture comprises up to 5% w/v polysaccharide composition. In some embodiments, the fluid mixture comprises between 0.5% and 5% w/v polysaccharide composition.

In some embodiments, the fluid mixture comprises at least 0.5%, at least 1%, at least 2%, at least 3%, at least 4%, at least 5%, at least 10%, at least 15%, at least 20%, at least 25%, at least 30%, at least 35%, or at least 40% w/v plasticiser. In some embodiments, the fluid mixture comprises up to 40% w/v plasticiser. In some embodiments, the fluid mixture comprises 0.5% and 40% w/v plasticiser. In some embodiments, the fluid mixture comprises at least 0.5%, at least 1%, at least 2%, at least 3%, at least 4%, at least 5%, at least 10%, at least 15%, at least 20%, at least 25%, at least 30%, at least 35%, or at least 40% v/v plasticiser. In some embodiments, the fluid mixture comprises up to 40% v/v plasticiser. In some embodiments, the fluid mixture comprises between 0.5% and 40% v/v plasticiser.

In some embodiments, the fluid mixture comprises at least 0.5%, at least 0.6%, at least 0.7%, at least at least 0.9%, at least 1%, at least 1.25%, at least 1.5%, at least 1.75%, at least 2%, at least 2.5%, at least 3%, at least 3.5%, at least 4%, at least 4.5%, or at least 5% v/v polyol. In some embodiments, the fluid mixture comprises up to 5% v/v polyol. In some embodiments, the fluid mixture comprises between 0.5% and 5% v/v polyol.

In some embodiments, the fluid mixture comprises at least 0.5%, at least 1%, at least 2%, at least 3%, at least 4%, at least 5%, at least 10%, at least 15%, at least 20%, at least 25%, at least 30%, at least 35%, or at least 40% w/v latex. In some embodiments, the fluid mixture comprises up to 40% w/v latex. In some embodiments, the fluid mixture comprises between 0.5% and 40% w/v latex.

In some embodiments, the fluid mixture comprises at least 0.05%, at least 0.1%, at least 0.2%, at least at least 0.4%, at least 0.5%, at least 0.75%, at least 1%, at least 2%, at least 3%, at least 4%, or at least 5% w/v emulsifying agent. In some embodiments, the fluid mixture comprises up to 5% w/v emulsifying agent. In some embodiments, the fluid mixture comprises between 0.05% and 5% w/v emulsifying agent. In some embodiments, the fluid mixture comprises at least 0.05%, at least 0.1%, at least 0.2%, at least 0.3%, at least 0.4%, at least 0.5%, at least 0.75%, at least 1%, at least 2%, at least 3%, at least 4%, or at least 5% v/v emulsifying agent. In some embodiments, the fluid mixture comprises up to 5% v/v emulsifying agent. In some embodiments, the fluid mixture comprises between 0.05% and 5% v/v emulsifying agent.

In some embodiments, the fluid mixture comprises an oil. In some embodiments, the fluid mixture comprises at least 0.1%, at least 0.2%, at least 0.3%, at least 0.4%, at least 0.5%, at least 0.75%, at least 1%, at least 1.25%, at least 1.5%, at least 1.75%, at least 2%, at least 3%, at least 4%, or at least 5% v/v oil. In some embodiments, the fluid mixture comprises up to 5% v/v oil. In some embodiments, the fluid mixture comprises between 0.1% and 5% v/v oil.

In some embodiments, the fluid mixture comprises a combined concentration of at least 0.15%, at least 0.2%, at least 0.3%, at least 0.4%, at least 0.5%, at least 0.75%, at least 1%, at least 1.25%, at least 1.5%, at least 1.75%, at least 2%, at least 3%, at least 4%, or at least 5% v/v oil and emulsifying agent. In some embodiments, the fluid mixture comprises a combined concentration of up to 5% v/v oil and emulsifying agent. In some embodiments, the fluid mixture comprises a combined concentration of between 0.15% and 5% v/v oil and emulsifying agent.

In some embodiments, the method comprises combining: (i) fungal biomass at a concentration of between 10% and 50%, (ii) a polysaccharide composition to a polysaccharide composition concentration of between 0.5% and 5% w/v; (iii) plasticiser to a plasticiser concentration between and 40% v/v; and (iv) an emulsifying agent to an emulsifying agent concentration of between and 5% v/v. In some embodiments, the method comprises further combining with an oil to a concentration of oil between 0.1% and 5% v/v.

In some embodiments, the method comprises combining: (i) fungal biomass at a concentration of between 10% and 50%, (ii) a polysaccharide composition to a polysaccharide composition concentration of between 0.5% and 5% w/v; (iii) a polyol to a polyol concentration between 0.5% and 5% v/v; and (iv) an emulsifying agent to an emulsifying agent concentration of between 0.05% and 5% v/v. In some embodiments, the method comprises further combining with an oil to a concentration of oil between 0.1% and 5% v/v.

In some embodiments, the method comprises combining: (i) fungal biomass at a concentration of between 10% and 50%, (ii) a polysaccharide composition to a polysaccharide composition concentration of between 0.5% and 5% w/v; (iii) latex to a latex concentration between 0.5% and 40% v/v; and (iv) an emulsifying agent to an emulsifying agent concentration of between 0.05% and 5% v/v. In some embodiments, the method comprises further combining with an oil to a concentration of oil between 0.1% and 5% v/v.

In some embodiments, the method comprises combining: (i) fungal biomass at a concentration of between 10% and 50%, (ii) a polysaccharide composition to a polysaccharide composition concentration of between 0.5% and 5% w/v; (iii) plasticiser comprising a polyol and latex to a concentration between 0.5% and 40% v/v; and (iv) an emulsifying agent to an emulsifying agent concentration of between 0.05% and 5% v/v. In some embodiments, the method comprises further combining with an oil to a concentration of oil between 0.1% and 5% v/v.

In some embodiments, the method comprises combining fungal biomass with agar powder, glycerol, and lecithin. In some embodiments, the method comprises combining: (i) fungal biomass at a concentration of between 10% and 50% w/v, (ii) agar powder to an agar concentration of between 0.5% and 5% w/v; (iii) glycerol to a glycerol concentration between 0.5% and 5% v/v; and (iv) lecithin to a lecithin concentration of between 0.05% and 5% v/v. In some embodiments, the method comprises further combining with sunflower oil to an oil concentration of between 0.1% and 5% v/v.

In some embodiments, the method comprises combining: fungal biomass at a concentration of between 10% and 50% w/v, 1% w/v agar, 1% v/v glycerol, and 1% v/v lecithin. In some embodiments, the method comprises combining fungal biomass at a concentration of between 10% and 40% w/v, 1% w/v agar, 1% v/v glycerol, 1% v/v sunflower oil, and 1% v/v lecithin.

In some embodiments, the method further comprises adhering the fungal material to a support material. Exemplary but non-limiting support materials are cotton, hemp, polyester, nylon, denim, and/or silk. In some embodiments, the method further comprises adhering the fungal material to one or more additional fungal materials.

In some embodiments, the method comprises adding a colourant to the fluid mixture. The colourant, fungal biomass, polysaccharide composition, plasticiser (e.g. polyol and/or latex), emulsifying agent, diluent, and optionally the oil can be combined in any order to provide a fluid mixture comprising a colourant.

In some embodiments, the method comprises adding an odorant to the fluid mixture. The odorant, fungal biomass, polysaccharide composition, plasticiser (e.g. polyol and/or latex), emulsifying agent, diluent, and optionally the oil can be combined in any order to provide a fluid mixture comprising an odorant.

In some embodiments, the method comprises chemically treating the fungal material to reduce or change the odour of the material.

In some embodiments, the method further comprises producing fungal biomass by growing fungal strain(s) in liquid growth media and/or on liquid growth media. In some embodiments, the method further comprises producing fungal biomass by growing fungal strain(s) on solid growth media. The growth media may be any growth media that is suitable for supporting fungal growth. In some embodiments, the growth media is selected from potato dextrose agar, Sabouraud dextrose agar, malt extract agar, Czapek dox agar, potato dextrose broth, Sabouraud dextrose broth, malt extract broth, and Czapek dox broth.

The invention also provides a fungal material produced by a method of the invention.

EXAMPLES

The invention will be further clarified by the following examples, which are intended to be purely exemplary of the invention and are in no way limiting.

Example 1

Fungal materials were produced having varying concentrations of emulsifying agent, polyol and oil to compare the influence of these components on susceptibility to water damage.

The fungal biomass was produced by mixing *Agaricus bisporus* fruiting bodies with tap water at a 1:1 ratio of water volume:mass of mushrooms. The fungal biomass was thoroughly mixed using a blender to produce a homogenised mixture. 100 mL of the homogenised mixture was added to a Duran bottle and agar powder was added to a final concentration of 1% w/v. Lecithin, glycerol and rapeseed oil were added to the concentrations recited in Table 1 and Table 2. The fluid mixture was then thoroughly mixed before being heated to 100° C. for 15 seconds using an 800 W microwave. Immediately after heating, the heated fluid mixtures were poured into the petri dishes and left to solidify for 25 minutes at room temperature (22° C.). Solidified fungal materials were then transferred to a 50° C. oven and allowed to dry for 30 hours.

Fungal materials of approximately 1.5 mm thickness and 55 mm diameter were subjected to immersion in tap water for 5 hours, after which they were dried. The dry weights of the fungal materials before and after the immersion treatment were recorded and are provided in Table 1. The degree of water damage is quantified as the % decrease in mass of the fungal material relative to the mass of the same fungal material prior to immersion treatment.

Results

Figure 1:
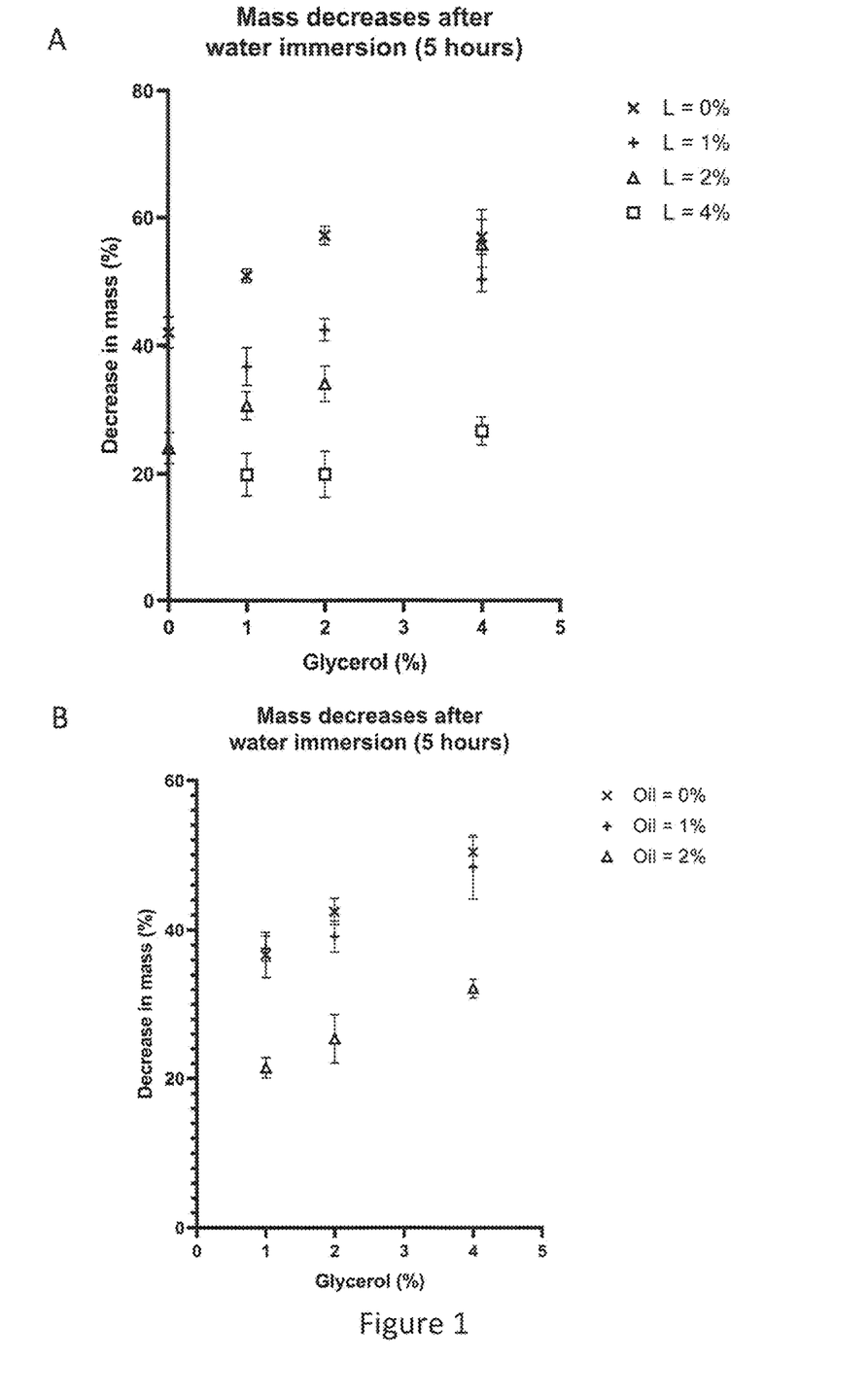
FIG. 1. Results of the water damage assay for fungal materials comprising: (A) varying concentrations of an emulsifying agent (lecithin) and a polyol (glycerol), and no oil; and (B) varying concentrations of an oil (rapeseed oil) and a polyol (glycerol), and 1% w/v (weight by volume) of an emulsifying agent (lecithin). N=3.
Figure 2:
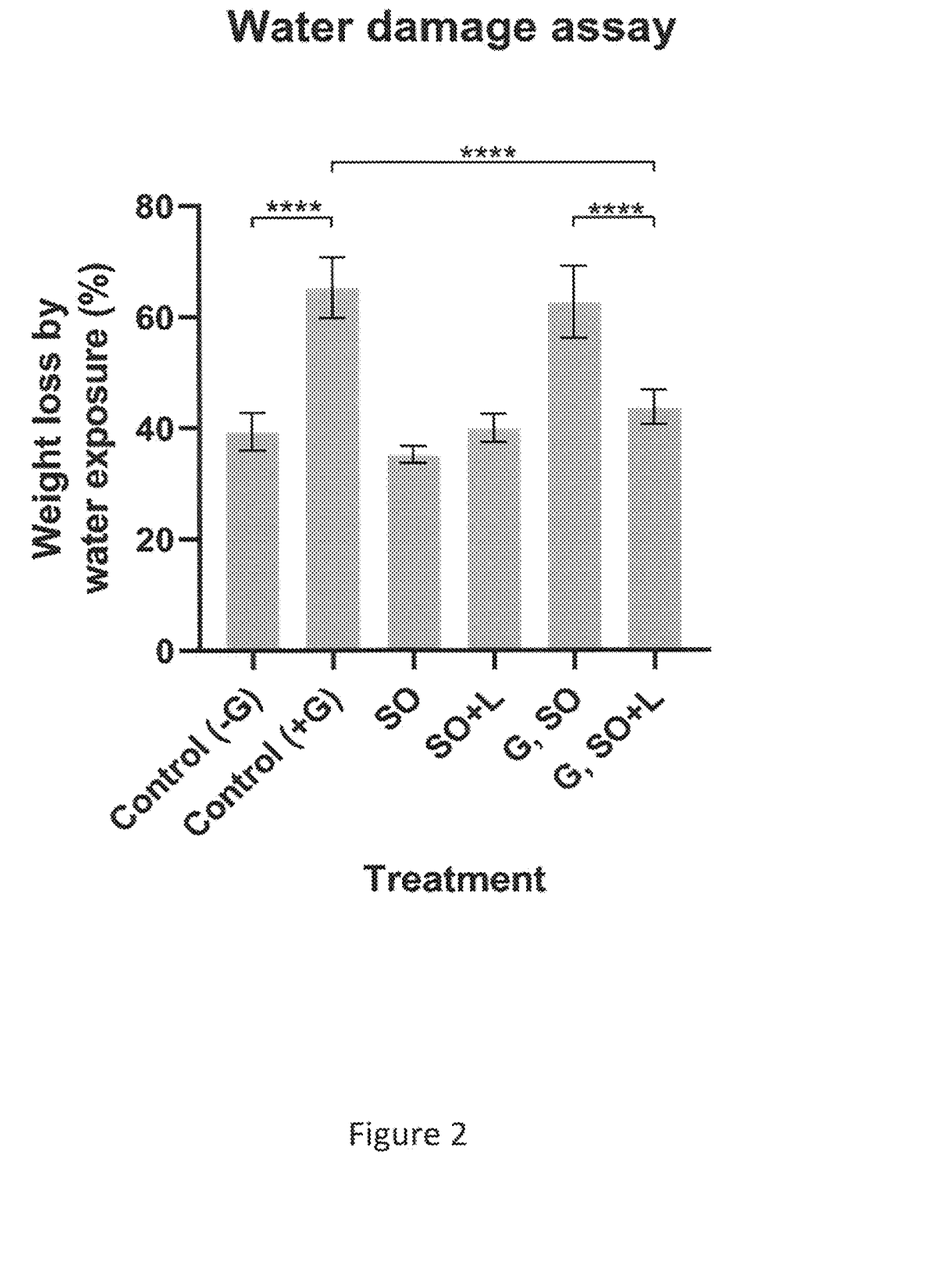
FIG. 2. Results of the water damage assay for fungal materials comprising a polyol (glycerol (G)), an oil (sunflower oil (SO)), and/or an emulsifying agent (lecithin (L)). Error bars show 95% confidence intervals. Significance: ****=p<0.0001 (1 way ANOVA with Bonferroni corrections). N=6.

Inclusion of the polyol, glycerol, (in the absence of emulsifying agent and oil) increased the susceptibility of the fungal material to water damage. However, this increased susceptibility to water damage was counteracted when the emulsifying agent, lecithin, was incorporated into the fungal material (FIG. 1). The results indicated that 4% w/v lecithin prevented an increase in the susceptibility to water damage even when the fungal material contained a high polyol concentration (4% v/v). The results further demonstrated that the inclusion of oil further reduced the susceptibility of the fungal materials to water damage (FIG. 2).

The results presented herein demonstrate that the inclusion of an emulsifying agent counteracts the increased susceptibility to water damage associated with the inclusion of polyol. Advantageously, the fungal materials of the invention benefit from increased flexibility associated with a polyol, such as glycerol, while retaining suitable levels of water resistance.

Glycerol and Lecithin Concentration in the Absence of Oil

TABLE 1

Results of water damage assay comparing the impact of lecithin and glycerol concentration on susceptibility to water damage.

| Glycerol | Lecithin | Oil | Decrease in mass (%) | | | |
|---|---|---|---|---|---|---|
| (% v/v) | (% w/v) | (% v/v) | rep 1 | rep 2 | rep 3 | mean |
| 0 | 0 | 0 | 43.41 | 45.43 | 37.33 | 42.06 |
| 1 | 0 | 0 | 49.06 | 51.07 | 52.81 | 50.98 |
| 2 | 0 | 0 | 56.27 | 60.06 | 55.48 | 57.27 |
| 4 | 0 | 0 | 62.02 | 52.96 | 56.14 | 57.04 |
| 1 | 1 | 0 | 40.44 | 38.84 | 30.76 | 36.68 |
| 2 | 1 | 0 | 40.15 | 41.39 | 45.90 | 42.48 |
| 4 | 1 | 0 | 46.59 | 51.90 | 52.72 | 50.40 |
| 0 | 2 | 0 | 19.37 | 27.45 | 25.09 | 23.97 |
| 1 | 2 | 0 | 31.61 | 33.68 | 26.36 | 30.55 |
| 2 | 2 | 0 | 35.10 | 28.70 | 38.20 | 34.00 |

TABLE 1-continued

Results of water damage assay comparing the impact of lecithin and glycerol concentration on susceptibility to water damage.

| Glycerol | Lecithin | Oil | Decrease in mass (%) | | | |
|---|---|---|---|---|---|---|
| (% v/v) | (% w/v) | (% v/v) | rep 1 | rep 2 | rep 3 | mean |
| 4 | 2 | 0 | 55.94 | 46.61 | 65.18 | 55.91 |
| 1 | 4 | 0 | 13.42 | 24.48 | 21.63 | 19.85 |
| 2 | 4 | 0 | 12.91 | 22.18 | 24.67 | 19.92 |
| 4 | 4 | 0 | 25.42 | 30.88 | 23.49 | 26.60 |

TABLE 2

Results of water damage assay comparing the impact of oil and glycerol concentration on susceptibility to water damage.

| Lecithin | Glycerol | Oil - Rapeseed | Decrease in mass (%) | | | |
|---|---|---|---|---|---|---|
| (% w/v) | (% v/v) | (% v/v) | Rep 1 | Rep 2 | Rep 3 | Mean |
| 1 | 1 | 0 | 38.84 | 40.44 | 30.76 | 36.68 |
| 1 | 2 | 0 | 45.90 | 41.39 | 40.15 | 42.48 |
| 1 | 4 | 0 | 52.72 | 46.59 | 51.90 | 50.40 |
| 1 | 1 | 1 | 34.98 | 40.70 | 36.93 | 37.53 |
| 1 | 2 | 1 | 35.06 | 40.35 | 41.98 | 39.13 |
| 1 | 4 | 1 | 55.47 | 48.92 | 40.73 | 48.37 |
| 1 | 1 | 2 | 22.10 | 23.40 | 18.75 | 21.42 |
| 1 | 2 | 2 | 19.94 | 24.85 | 31.28 | 25.36 |
| 1 | 4 | 2 | 31.37 | 30.42 | 34.74 | 32.18 |

Example 2

Methods

Six different fungal materials were produced as described in Example 1 to compare how polyol, oil and emulsifying agent influence the susceptibility of the fungal material to water damage. The composition of the six fungal materials used in this experiment is provided below:

- "Control (−G)": fungal material produced from fluid mixture comprising homogenised fungal biomass and 1% w/v agar;
- "Control (+G)": fungal material produced from fluid mixture comprising homogenised fungal biomass, 1% w/v agar, and 1% v/v glycerol.
- "SO": fungal material produced from fluid mixture comprising homogenised fungal biomass, 1% w/v agar, and 0.5% v/v sunflower oil;
- "SO+L": fungal material produced from fluid mixture comprising homogenised fungal biomass, 1% w/v agar, 0.5% v/v sunflower oil, and 0.5% v/v lecithin;
- "G, SO": fungal material produced from fluid mixture comprising homogenised fungal biomass, 1% w/v agar, 0.5% v/v sunflower oil, and 1% v/v glycerol;
- "G, SO+L": fungal material produced from fluid mixture comprising homogenised fungal biomass, 1% w/v agar, 0.5% v/v sunflower oil, 0.5% v/v lecithin, and 1% v/v glycerol.

A water damage assay was conducted by submerging the fungal materials in 100 mL tap water for 24 hours. Fungal materials were then dried at 50° C. for 4 hours. Once dried, the fungal materials were weighed. Six replicates were used for each fungal material. The starting fungal material samples were approximately 1.5 mm thick with a diameter of approximately 55 mm.

A weight loss percentage score was calculated by comparing the weight of the fungal material before and after the water damage assay. The water damage assay results were analysed using 1 way ANOVA, with Bonferroni corrections applied to compare multiple means.

Results

The results indicate that weight loss was highest for fungal materials containing glycerol without sunflower oil and lecithin (control (+G)) (mean=65.32%; Table 3) indicating that the addition of glycerol significantly increases the susceptibility of fungal materials to water damage. However, the addition of sunflower oil and lecithin (G, SO+L) counteracted this effect, and significantly reduced the degree of weight loss (mean=43.8; Table 3). As shown in FIG. 3, fungal materials comprising glycerol, sunflower oil, and lecithin (G, SO) exhibited a 32.95% reduction in loss by water damage as compared to fungal materials comprising glycerol (Control (+G)).

Interestingly, fungal materials comprising sunflower oil and glycerol (G, SO), but without lecithin, did not demonstrate a significant difference in weight loss compared to fungal material containing glycerol only (control (+G)) (mean=62.65; Table 3).

These results indicate that the emulsifying agent and the oil act synergistically in the presence of glycerol to reduce the susceptibility of fungal materials to water damage.

TABLE 3

Results of water damage assay. Mean values of percentage loss by water damage are shown (n = 6).

| Treatment | Explanation | Mean (%) |
|---|---|---|
| Control (−G) | No glycerol control | 39.37 |
| Control (+G) | Control (with 1% v/v glycerol) | 65.32 |
| SO | 0.5% v/v Sunflower oil (no glycerol) | 35.17 |
| SO + L | 0.5% v/v Sunflower oil with 0.5% w/v lecithin (no glycerol) | 40.01 |
| G, SO | 0.5% v/v Sunflower oil (with 1% v/v glycerol) | 62.65 |
| G, SO + L | 0.5% v/v Sunflower oil with 0.5% w/v lecithin (with 1% v/v glycerol) | 43.8 |

Example 3

Fungal materials were produced having varying concentrations of lecithin, polyol and natural latex rubber to compare the influence of these components on susceptibility to water damage.

Methods

The fungal biomass was produced by mixing *Agaricus bisporus* fruiting bodies with tap water at a 1:1 ratio of water volume:mass of mushrooms. The fungal biomass was thoroughly mixed using a blender to produce a homogenised mixture. 100 mL of the homogenised mixture was added to a Duran bottle and kappa carrageenan powder was added to a final concentration of 1% w/v. Lecithin, natural latex rubber and glycerol were added to the concentrations recited in Table 4. The fluid mixture was then thoroughly mixed before being heated to 100° C. for 15 seconds using an 800 W microwave. Immediately after heating, the heated fluid mixtures were poured into petri dishes and left to solidify for 25 minutes at room temperature (22° C.). Solidified fungal materials were then transferred to a 50° C. oven and allowed to dry for 30 hours.

Fungal materials of approximately 1.5 mm thickness and 55 mm diameter were subjected to immersion in tap water for 5 hours, after which they were dried. The dry weights of the fungal materials before and after the immersion treatment were recorded and are provided in Table 4. The degree of water damage is quantified as the % decrease in mass of the fungal material relative to the mass of the same fungal material prior to immersion treatment.

Results

The results show that in all cases, the inclusion of lecithin powder decreased the level of water damage (decrease in mass) compared to the equivalent material without lecithin. This was the case in materials containing glycerol, natural latex rubber at low and high concentrations, and both glycerol and latex rubber.

TABLE 4

Results of water damage assay comparing the impact of lecithin on susceptibility to water damage of materials containing glycerol and/or natural latex rubber.

| Glycerol (% v/v) | Natural latex rubber (% v/v) | Lecithin (% w/v) | Decrease in mass (%) | | | |
|---|---|---|---|---|---|---|
| | | | Rep 1 | Rep 2 | Rep 3 | Mean |
| 0 | 0 | 0 | 46.23 | 51.53 | 45.61 | 47.79 |
| 1 | 0 | 0 | 61.66 | 53.05 | 57.35 | 57.35 |
| 0 | 1 | 0 | 39.85 | 37.29 | 43.74 | 40.29 |
| 1 | 1 | 0 | 50.18 | 55.98 | 46.31 | 50.82 |
| 0 | 30 | 0 | 4.81 | 5.03 | 4.35 | 4.73 |
| 0 | 0 | 2 | 33.08 | 29.01 | 32.19 | 31.43 |
| 1 | 0 | 2 | 37.39 | 41.58 | 34.08 | 37.68 |
| 0 | 1 | 2 | 28.76 | 25.27 | 28.39 | 27.48 |
| 1 | 1 | 2 | 39.95 | 38.30 | 42.36 | 40.20 |
| 0 | 30 | 2 | 2.95 | 2.92 | 3.14 | 3.00 |

The invention claimed is:

1. A fungal material comprising:
    (a) fungal biomass;
    (b) a polysaccharide-based matrix;
    (c) a plasticiser;
    (d) an emulsifying agent; and optionally
    (e) a diluent;
    wherein the plasticiser comprises latex.

2. The fungal material of claim 1, wherein the plasticiser further comprises a polyol.

3. The fungal material of claim 1; wherein the fungal material comprises an oil.

4. The fungal material of claim 1, wherein the fungal biomass comprises at least one of fungal fruiting bodies, fungal mat(s), mycelium, and hyphae.

5. The fungal material of claim 1, wherein the fungal biomass is present in an amount between 10% and 50% w/w of the fungal material.

6. The fungal material of claim 1, wherein the polysaccharide-based matrix is selected from an agarose-based matrix, a carrageenan-based matrix, an alginate-based matrix, a cellulose-based matrix, and a chitosan-based matrix.

7. The fungal material of claim 6, wherein the agarose-based matrix is agar.

8. The fungal material of claim 1, wherein the polysaccharide-based matrix is present in an amount between 0.2% and 8% w/w of the fungal material.

9. The fungal material of claim 1, wherein the plasticiser is present in an amount between 0.5% and 40% v/v of the fungal material.

10. The fungal material of claim 2, wherein the polyol is selected from glycerol, sorbitol, erythritol, xylitol, maltitol, mannitol, lactitol, polyglycitol, and isomalt.

11. The fungal material of claim 2, wherein the polyol is present in an amount between 0.5% and 5% w/w of the fungal material.

12. The fungal material of claim 1, wherein the the latex is present in an amount between 0.5% and 40% w/w of the fungal material.

13. The fungal material of claim 1, wherein:
    the fungal biomass is present in an amount between 10% and 50% w/w of the fungal material;
    the polysaccharide-based matrix is present in an amount between 0.2% and 8% w/w of the fungal material; and
    the latex is present in an amount between 0.5% and 40% w/w of the fungal material.

14. The fungal material of claim 2, wherein:
    the fungal biomass is present in an amount between 10% and 50% w/w of the fungal material;
    the polysaccharide-based matrix is present in an amount between 0.2% and 8% w/w of the fungal material;
    the polyol is present in an amount between 0.5% and 5% w/w of the fugal material; and
    the latex is present in a amount between 0.5% and 40% w/w of the fungal material.

15. The fungal material of claim 13, wherein the fungal material comprises an oil.

16. The fungal material of claim 14, wherein the fungal material comprises an oil.

17. A method of producing the fungal material of claim 1, the method comprising:
    (a) combining fungal biomass, a polysaccharide composition, a plasticiser, an emulsifying agent and a diluent to produce a fluid mixture, wherein the polysaccharide composition is capable of forming a polysaccharide-based matrix; and
    (b) solidifying the fluid mixture to produce a fungal material comprising a polysaccharide-based matrix.

18. The fungal material of claim 1, produced by a method comprising:
    (a) combining the fungal biomass, a polysaccharide composition, the plasticiser, the emulsifying agent and the diluent to produce a fluid mixture, wherein the polysaccharide composition is capable of forming the polysaccharide-based matrix; and
    (b) solidifying the fluid mixture to produce the fungal maerial comprising the polysaccharide-based matrix.

19. A leather substitute comprising the claim 1.

20. A plastic substitute comprising the fungal material of claim 1.

21. A rubber substitute comprising the fungal material of claim 1.

22. An insulation material comprising the fungal material of claim 1.

23. A packaging material comprising the fungal material of claim 1.

24. A foodstuff comprising the fungal material of claim 1.

* * * * *

UNITED STATES PATENT AND TRADEMARK OFFICE
CERTIFICATE OF CORRECTION

PATENT NO. : 12,031,266 B2
APPLICATION NO. : 18/239656
DATED : July 9, 2024
INVENTOR(S) : Peter A. D. Wellham et al.

It is certified that error appears in the above-identified patent and that said Letters Patent is hereby corrected as shown below:

In the Specification

In the Examples:
Column 18, Line 37, please delete "(FIG. 1)." and insert --FIG.1 (A).--

Column 18, Line 42, please delete "(FIG. 2)." and insert --FIG.1 (B).--

Column 20, Line 11, please delete "FIG. 3." and insert --FIG. 2.--

In the Claims

Column 21, Line 39, please delete "claim 1;" and insert --claim 1,--

Column 22, Line 7, please delete "wherein the the latex" and insert --wherein the latex--

Column 22, Lines 47 and 48, please delete "fungal ma erial" and insert --fungal material--

Column 22, Line 49, please delete "the claim 1." and insert --the fungal material of claim 1.--

Signed and Sealed this
Twenty-sixth Day of November, 2024

Katherine Kelly Vidal
*Director of the United States Patent and Trademark Office*